United States Patent [19]
Wofford

[11] Patent Number: 6,162,482
[45] Date of Patent: Dec. 19, 2000

[54] PROCESS FOR MAKING A STABILIZED CANNED GROUND MEAT

[76] Inventor: Miles Wofford, 5200 Beautonne, El Paso, Tex. 79924-5306

[21] Appl. No.: 08/811,641

[22] Filed: Mar. 5, 1997

Related U.S. Application Data

[63] Continuation of application No. 08/483,542, Jun. 7, 1995, abandoned, which is a continuation-in-part of application No. 08/218,626, Mar. 28, 1994, abandoned, which is a continuation-in-part of application No. 07/891,295, May 29, 1992, abandoned.

[51] Int. Cl.$^7$ ....................................................... A23L 1/05
[52] U.S. Cl. ......................... 426/576; 426/131; 426/397; 426/574; 426/654; 426/657
[58] Field of Search ..................................... 426/106, 131, 426/321, 397, 399, 512, 513, 573, 574, 576, 654, 657, 810

[56] References Cited

U.S. PATENT DOCUMENTS

| | | |
|---|---|---|
| 2,163,164 | 6/1939 | Wickenden et al. . |
| 2,206,483 | 7/1940 | Meaker . |
| 2,558,065 | 6/1951 | Tice . |
| 3,264,121 | 8/1966 | Tuomy et al. . |
| 3,578,497 | 5/1971 | Hjermstad . |
| 3,763,138 | 10/1973 | Rakoczy . |
| 3,889,002 | 6/1975 | Clausi et al. . |
| 3,904,771 | 9/1975 | Donnelly et al. . |
| 4,148,929 | 4/1979 | Gorflen et al. . |
| 4,341,810 | 7/1982 | Shank . |
| 4,554,169 | 11/1985 | Anderson et al. . |
| 4,588,603 | 5/1986 | Wofford . |

FOREIGN PATENT DOCUMENTS

| | | |
|---|---|---|
| 2012559 | 3/1970 | France . |
| 2058105 | 4/1981 | United Kingdom . |

OTHER PUBLICATIONS

Bitting, A.W., Appertizing, 1937, pp. 762–768, The Trade Pressroom, San Francisco, CA.

Industrial and Engineering CHemistry, vol. 22, p. 57, Jan. 1930, "A Study of Some Properties of Gelatin"—Harvey A. Neville, Edwin R. Theis and R.B. K'Burg—I—Hydration of Gelatin and its Relation to Swelling; II–A Method for Determing Transition etc.

Excerpts from Atlantic Bulletin, 1962 pp. 1, 4, 5–8, 10, 11 and 13.

*Primary Examiner*—Leslie Wong
*Attorney, Agent, or Firm*—Bierman, Muserlian and Lucas

[57] ABSTRACT

The stabilizer is able to stabilize both fat/oil and water in food and to operate in a temperature range that encompasses both the freezer and the oven. The stabilizer is a composite of gelatin, an acid, a sugar component and/or a starch component. The gelatin component is made by treating the gelatin in an aqueous slurry with an acid such that a pH of 1.0 to 4.5 is maintained throughout the treatment process. The stabilizer is used to make a variety of foodstuffs.

10 Claims, No Drawings

PROCESS FOR MAKING A STABILIZED CANNED GROUND MEAT

CROSS-REFERENCES TO RELATED APPLICATIONS

This is a continuation of application Ser. No. 08/483,542 filed Jun. 7, 1995, now abandoned, which was a continuation-in-part of application Ser. No. 08/218,626 filed Mar. 28, 1994, now abandoned, which was a continuation-in-part of application Ser. No. 07/891,295 filed May 29, 1992, now abandoned.

BACKGROUND OF THE INVENTION

1. Field of the Invention

This invention relates to food and, more particularly, to a water and fat or oil stabilizer for use in food which is able to function through a broad temperature range. The stabilizer of the present invention is especially suited for frozen foods which are heated for consumption and, especially, frozen foods which are heated in a microwave oven prior to consumption. Claims are also presented to the food itself.

2. Description of the Related Art

Water and fat/oil are present in virtually all foodstuffs and especially all prepared foodstuffs. Typically, prepared foodstuffs go through a broad range of temperatures, freezing (−25° C.) to canning or retorting (120° C.) to baking (250° C.), as well as prolonged storage, oftentimes in either a chilled or frozen state prior to consumption. The broad temperature ranges and extended storage have a deleterious effect on the stability of the water and fat/oil in the foodstuff. Both water and fat/oil tend to migrate out of the foodstuff during prolonged storage and when the foodstuff is heated. This deleterious effect manifests itself in a number of ways, for example the foodstuff becomes dry or soggy, greasy, tough, chewy or brittle. These problems are due not only to simple movement of the fat/oil and water in the foodstuff but also to the breakdown of the foodstuff, such as the breakdown of the oil emulsion. The problem of stabilizing water and fat/oil in a foodstuff is especially a problem in the food industry where the foodstuff is subjected to a myriad of stresses due to the equipment used to mass produce the foodstuff.

To date, no one stabilizer has been found that is able to function in such a broad range of temperatures and to withstand extended frozen storage. There is a need in the food industry for a stabilizer that can withstand commercial processing, prolonged storage and operate in a broad temperature range, −25° C. to 250° C., without breaking down.

SUMMARY OF THE INVENTION

A fat or oil and water stabilizer for use in food has now been discovered which operates in a broad temperature range, over prolonged storage periods, and under commercial processing conditions. By preventing the loss of water from a foodstuff, microbial growth or spoilage of the foodstuff is also delayed and/or prevented. Also, by stabilizing fat/oil and water, emulsions of fat/oil in water which are present in a number of foodstuffs such as salad dressings are also stabilized.

The stabilizer of the present invention works not only to prevent moisture loss of a stored, frozen or chilled food but also of that frozen or chilled food after heating and prior to consumption. The stabilizer of the present invention also prevents moisture loss from fresh breads and the like which are prepared from either fresh doughs or frozen doughs, thereby extending the shelf life of the farinaceous product. It has also been found that the stabilizer of the present invention also increases the shelf life of meat products such as a summer sausage which do not require refrigeration. In other words, the stabilizer of the present invention works in a broad temperature range and does not break down even after being subjected to prolonged periods in the freezer and the stress of cooking in a wide variety of foodstuffs. The stabilizer of the present invention has also been found to withstand repeated freeze-thaw cycles. Furthermore, novel canned meats can be formulated using the process of the present invention.

Broadly, the process for stabilizing water in a foodstuff in accordance with the present invention comprises the steps of:

(a) agitating a slurry of gelatin, acid and water, at a temperature of about 10° C. to about 100° C., for a period of time of at least about 10 minutes, to fully hydrate said gelatin, said gelatin being present in said slurry in an amount of about 0.5 to 15% by weight of said slurry, said acid being present in an amount to cause said slurry to have a pH of about 1.0 to about 4.5;

(b) maintaining the pH of said slurry at about 1.0 to about 4.5;

(c) recovering a gelatin component having a pH of about 1.0 to about 4.5; and (d) adding said gelatin component to a foodstuff having water in an amount sufficient to stabilize said water. Optionally, the recovered gelatin component is dried and added to a foodstuff in a particulate form.

In order to stabilize both water and a fat/oil, a starch component and/or a sugar component must be incorporated into the foodstuff along with the gelatin component. The starch component and/or sugar component is suitably employed in the present invention either: (1) by being added to the acid-gelatin slurry during the agitation; (2) by being dried with the gelatin and acid; (3) by being mixed with the dried particulate gelatin; or (4) by being added to the foodstuff along with the gelatin component.

DESCRIPTION OF THE PREFERRED EMBODIMENTS

Suitable starch components include flour, starch granules, pregelatinized starch, chemically modified starch, and derivatives of starch such as dextrins, maltodextrins, and corn syrups. Suitable sugar components include monosaccharides such as glucose, fructose, ribose, arabinose, mannose, xylose or galactose; disaccharides such as sucrose, maltose, cellobiose, lactose, or trehalose; and trisaccharides such as maltotriose, raffinose, cellotriose or manninotriose.

It has been found that the amount of acid can be reduced in the slurry if a sugar component selected from the group consisting of monosaccharides and disaccharides is present. Where the stabilizer of the present invention is used in a farinaceous product, it is preferred that a portion of the acid be reduced in the slurry and a sugar component selected from the group consisting of monosaccharides and disaccharides be substituted for a portion of the acid. Good results have been obtained with sucrose, glucose and fructose.

The amount of gelatin in the slurry is preferably about 1 to about 10% by weight. The amount of starch component used in the slurry, step (a), is preferably about 0.5% to about 10% by weight and, more preferably, about 1% to about 8% by weight slurry. The amount of starch component added to the foodstuff, step (c), is about 0.1% to about 5% and, more preferably, about 0.5% to about 3.0% by weight based on the weight of dry gelatin added.

In U.S. Pat. No. 4,588,603 issued May 13, 1986, a process for preparing a stabilized food is disclosed wherein the stabilizer is an aqueous solution of fully hydrated, fully-swollen gelatin and an acid. The stabilizer of the '603 patent requires the use of non-halogenated water. Applicant has found that, by using enough acid to lower the pH to about 1.0 to about 4.5 and maintaining the pH at about 1.0 to about 4.5 to recover a gelatin component at a pH of about 1.0 to about 4.5, tap water can be used in preparing a food stabilizer.

The stabilizer of the present invention stabilizes both water and fat/oil in a variety of food systems to include eggs, doughs, sauces and gravies, and ground meats. For instance, in a frozen burrito, the stabilizer of the present invention is used both in the filling of the burrito as well as the flour tortilla. In a frozen pancake, the stabilizer of the present invention is used in both the pancake itself as well as the maple syrup which is used on top of the pancake, both of which were frozen and pre-wrapped for sale to the consumer. In yet another example, the stabilizer of the present invention is used not only in the filling of a chicken pot pie but also the crust. Alternatively, the stabilizer is used only in the crust of the pie and not in the filling to stabilize the crust only.

It has been found that the stabilizer of the present invention not only stabilizes the water and fat/oil in the food but also prevents the food containing the stabilizer of the present invention from absorbing water and fats/oils. Such is beneficial in crusts, coatings, breadings, batters, and doughs since it means that where the farinaceous product contains the stabilizer of the present invention while a portion of the foodstuff does not, that portion of the foodstuff that does not contain the stabilizer will not affect the farinaceous portion of the food.

It has also been found that the stabilizer of the present invention will continue to operate in the foodstuff even after the foodstuff has been heated for consumption. Even though the stabilizer of the present invention does not easily break down in the food system, it is digestible by humans and classified as generally recognized as safe (GRAS) for human consumption. Furthermore, a novel canned meat can be prepared using the stabilizer of the present invention.

Preferably, the gelatin component is prepared through a slow heating process wherein acid, water and gelatin are heated between 10° C. and about 100° C. over a period of about ½ hour to about 1½ hours, so as to fully swell and hydrate the gelatin. In the slow heating process the gelatin granules are allowed to hydrate and fully expand under controlled conditions to thereby increase their water and fat/oil stabilizing capability.

The water used to form the slurry can contain halogen, e.g. chlorine, bromine and fluorine; and metal ions which are found in conventional tap water; so long as the pH of the slurry is maintained throughout the process.

The amount and type of acid are essential elements in obtaining the stabilizer of the present invention. If the water is too acidic, then the gelatin is case hardened and unable to fully swell. If the water is not acidic enough, then the gelatin does not fully swell. The pH of the water must be between about 1.0 and about 4.5 and preferably about 4.

Suitable acids such as glacial acetic acid, citric acid, malic acid, ascorbic acid, succinic acid, tartaric acid, hydrochloric acid, sulfuric acid, phosphoric acid, lactic acid, maleic acid and aqueous solutions thereof can be used. The preferred acids are glacial acetic, citric, hydrochloric, sulfuric, phosphoric and lactic, with phosphoric being most preferred.

The amount of acid is sufficient to adjust the pH to within the desired range of 1.0 to 4.5.

In one specific example the gelatin is prepared by using between 6 and 60 parts of water at about 10° C. and 25° C. combined with enough phosphoric acid to adjust the pH of the water to about 2, and then adding about 1 part of gelatin to form an acidic gelatinous aqueous slurry. The slurry is then mildly agitated for a period of time sufficient to disperse uniformly the gelatinizing agent throughout the solution so as to form a gelatinous slurry. The agitation usually continues for approximately 5 minutes. Next, the slurry is maintained at a temperature of between about 10° C. and 25° C. until the gelatin granules have become partially swollen and hydrated, usually between 15 and 25 minutes. The slurry is then agitated and heated to a temperature of between about 30° C. and 50° C. until the gelatin granules become further swollen and hydrated whereby the slurry becomes smooth and non-granular to feel. The slurry is usually held at this temperature for a period of between 10 and 30 minutes. The slurry is then further heated under agitation to a temperature of between about 65° C. and 70° C. until a uniformly clear solution is obtained. The pH of the slurry is periodically monitored throughout the process and adjusted to about 4 at the end of the process before recovering the gelatin component.

Conventional equipment is used to conduct the soaking and subsequent heating of the slurry. The slurry is mildly agitated throughout the heating program to maintain a uniform dispersion of gelatin and acid in water.

The solids level of the slurry of gelatin is preferably about 5 to about 50 parts by weight water to about 1 part by weight gelatin.

In one embodiment, the slurry is dried in any conventional manner to a moisture content of about 1% to about 15% and, more preferably, about 6%. The drying is done in a conventional way using conventional equipment, e.g. spray dryer, drum dryer, tray dryer, oven dryer, or freeze dryer. Good results have been accomplished with using a spray dryer or tray dryer. For small scale operations, a convection oven has been used with good results. The drying must be gentle enough so as not to destroy the gelatin while still driving off the moisture. The swollen gelatin and acid which is dried in an oven on a tray forms continuous sheets of material. These sheets must be ground so as to make them readily able to be added to food. Depending upon the volatility of the acid used during hydration of the gelatin, some of the acid will be driven off during drying.

Gelatin is a product obtained by the partial hydrolysis of collagen derived usually from the skin, white connective tissue, and bones of animals. It is a derived protein composed of various amino acids linked by adjacent amino and carbonyl groups to provide a peptide bond. Type-B gelatin is prepared by swelling the raw materials (usually ossein or hide stock) in an alkali saturated lime solution for 3–12 weeks. On the other hand, type-A gelatin is prepared by swelling raw materials (usually pork skins) in a dilute acid solution at a pH of 1 to 2 for 10 to 30 hours. The acid solution is prepared from hydrochloric acid, sulfurous acid, phosphoric acid or sulfuric acid. In accordance with the present invention, type-A gelatin or type-B gelatin may be utilized. The gelatin is also classified by Bloom strength. Bloom strength is a conventional numerical designation which distinguishes gelatin on a gel strength basis. Preferably, the Bloom strength of the gelatin employed in the present invention is about 175 to about 300 and, more preferably, about 200. The lower the bloom strength of the gelatin, the larger the amount of gelatin needed.

The formation of the stabilizer of the present invention is preferably accomplished by mixing a starch component in with the slurry of acid and water and gelatin in the soaking step. The starch component added to the soaking step is preferably starch granules, pregelatinized starch or lightly modified starch. Preferably, the starch component is selected from cereal grains, tubers or roots, with the cereal grains such as wheat and corn being preferred. Whichever starch component is used, it should be capable of fully gelatinizing. In the case of pregelatinized starch, the starch granule is generally completely gelatinized after the first heating step at 30° C. to 50° C. In the case of starch granules, it is generally necessary to heat the slurry in the second heating step to about 80° C. to about 95° C. and hold the slurry at that temperature for about 10 to about 20 minutes to fully gelatinize the starch granules. Naturally, the temperature and time necessary to fully gelatinize the starch granules will be dependent upon the gelatinization point of the starch.

The amount of starch component used is preferably about 1 part to about 6 parts by weight starch based on 1 part by weight gelatin.

In one specific example, when pregelatinized starch is utilized, the stabilizer is prepared by combining between about 6 and 50 parts of water and enough acid to adjust the pH of the water to about 1.0 to 4.5 and then adding about 1 part of a mixture of gelatin and starch (the gelatin to starch being in a proportion of 1:6 to 1:1) to the water at a temperature of between about 0° C. and 25° C. to form an acidic gelatinous aqueous solution. The solution is then agitated for a period of time sufficient to thoroughly mix the gelatin and starch throughout the solution so as to form a gelatinous slurry. Agitating the solution for about 5 minutes is usually sufficient for this purpose. The slurry is then maintained at a temperature of between 0° C. and 25° C. until the gelatin granules have become partially swollen and hydrated. This step is usually conducted for between 15 and 25 minutes. Next, the slurry is heated to a temperature of between about 30° C. and 50° C. and is maintained at this temperature for about 10 to 30 minutes at which time both the gelatin as well as the pregelatinized starch are fully hydrated and wherein the slurry has been transformed into a uniformly clear solution. The slurry is then raised to a temperature of about 65° C. to about 70° C., preferably 68° C., and can be dried in a conventional manner using conventional equipment as previously described.

In yet another example, the stabilizer is prepared from water, an acid constituent and a mixture of gelatin and starch. The stabilizer is formed by combining between about 6 and 50 parts of water, enough acid to adjust the pH of the water to about 1.0 to about 4.5 and then adding about 1 part of a mixture of gelatin and non-gelatinized starch (the gelatin to starch ratio being between 1:6 to 1:1) to the water at a temperature of between about 0° C. and 25° C. thereby forming an acidic gelatinous aqueous solution. Next, the solution is agitated to disperse uniformly the gelatin and starch throughout the solution thereby forming a gelatinous slurry. The agitation may be continued for about 5 minutes. The slurry is then maintained at about 0° C. to about 25° C. until the gelatin granules have become partially swollen and hydrated. This hydration step usually takes between 15 to 25 minutes. The slurry is then heated to between about 30° C. and 50° C. and maintained at this temperature for about 10 to 30 minutes under agitation. At this point, the gelatin granules have become fully hydrated. Next, the slurry is raised to a temperature of between about 80° C. and 95° C. and maintained at this temperature for between 10 to 20 minutes. The slurry is then dried as described heretofore if desired.

It has also been found that the stabilizer of the present invention can be formed in-situ where the gelatin component is first made and then the starch component and the gelatin component are added and mixed at the same time with the food ingredients.

Where the formation of the stabilizer is in-situ, the food ingredient along with the stabilizer must be heated to above about the gelatinization point of the starch component to gelatinize the starch component.

The stabilizer of the present invention is added to the prepared foodstuff during initial preparation. Broadly, the stabilizer is added to the foodstuff in an amount sufficient to stabilize both the water and/or fat/oil present in the foodstuff. This amount will vary depending on, primarily, the amount of water and/or fat/oil that is present in the foodstuff.

More specifically, the amount of stabilizer added to the foodstuff will depend on the amount of water and/or fat/oil which is liberated by the foodstuff. Water is often liberated by a foodstuff during storage in a freezer, conventionally referred to as ice crystal formation, on the food and/or packaging. Both water and fat/oil are liberated during cooking, especially in a microwave oven, prior to consumption of the food product.

Preferably, between about 0.1 to about 5.0 parts by weight of the stabilizer of the present invention where the total weight of the food system is 100 parts is used in the foodstuff. Good results have been obtained using about 0.2 to 0.5 parts by weight of the stabilizer of the present invention based on 100 parts by weight of foodstuff.

As noted above, a canned meat having improved texture can be made using the stabilizer of the present invention. Broadly, in order to make a canned meat in accordance with the present invention, the following steps are employed:

A) dissolving gelatin in water by first hydrating gelatin in water with a sufficient amount of acid to adjust the pH of the water to about 1 to about 4, and then heating the hydrated gelatin to about 140° F. (60° C.) to fully dissolve the gelatin in the water;

B) hydrating starch in water in the presence of sodium tripoly phosphate;

C) combining a ground meat with a sodium salt to form a mixture.

D) mixing the dissolved gelatin, the hydrated starch and the meat and salt mixture to form a meat formulation; and E) canning said meat formulation to produce a canned meat having improved texture.

Suitable ground meat includes chicken, pork, beef, turkey, horse, lamb and fish. Good results have been obtained with chicken.

The presence of sodium in the canned meat is important and it is preferred that the amount of the sodium in the formulation is about 0.25% to about 5% by weight of the formulation. Good results have been obtained when the salt content of the meat formulation is about 2% by weight of the formulation.

The canning process is accomplished in a conventional manner using conventional equipment. Typically, the raw ingredients are combined, placed into a container and the container sealed. The sealed container is subjected to high temperatures to commercially sterilize the contents of the container. This process is also conventionally referred to as retort food processing.

The preferred amount of each component in the canned meat is:

| Component | Percent by Weight |
|---|---|
| Ground Meat | 75%–95% |
| Gelatin | 0.1%–5.0% |
| Starch | 0.1%–50% |
| Sodium | 0.25%–5.0% |
| Water | 2.5%–5% |

A more preferred formulation for the canned ground meat made in accordance with the present invention is:

| Component | Percent by Weight |
|---|---|
| Ground Meat | 85% |
| Gelatin | 0.5% |
| Starch | 2.5% |
| Sodium | 2.0% |
| Water | 10% |

All of these percents are based on the total weight of the canned meat formulation.

These and other aspects of the present invention may be more fully understood by reference to the following examples.

EXAMPLE 1

This example illustrates making the gelatin component.

First, 8 parts of water are combined with enough acid to raise the pH of the water to 2 at 10° C. After mixing the solution, 1 part of granular gelatin is added to the solution. The solution is then agitated for 5 minutes forming a slurry, and is allowed to stand at room temperature for 20 minutes. The slurry is then heated to 70° C. and the pH of the slurry readjusted to 4, thereby producing the gelatin component. In order to dry the gelatin component, the mixture is spread on a tray and placed in a tray dryer using hot air at 35° C. and a humidity of 20% for six hours. This dries the gelatin and acid composition down to a moisture level of about 6–12%.

Since the dried composition is in sheet form, it is ground to a particulate of about 30–40 mesh in order to facilitate its use in food.

EXAMPLE 2

This example illustrates making a tuna salad with the stabilizer of the present invention.

| Formula | Percent |
|---|---|
| Tuna | 42.11 |
| Salad dressing | 42.11 |
| Pickle relish | 12.62 |
| Water | 2.86 |
| Stabilizer of Example 1 | 0.32 |

All components are mixed together at 30° C. and then frozen.

EXAMPLE 3

This example illustrates making pimento cheese with the stabilizer of the present invention.

| Formula | Percent |
|---|---|
| Grated cheese | 40.32 |
| Salad dressing | 40.32 |
| Canned pimentos, diced | 12.24 |
| Kraft cheese Tang | 4.08 |
| Water | 1.84 |
| Stabilizer of Example 1 | 0.20 |

All components are mixed together at 30° C. and then frozen.

EXAMPLE 4

This example illustrates making a fried chicken patty. First, ground chicken is mixed with starch, Fridex W, and with the stabilizer of Example 1. From the mix, conventionally sized patties are formed. Then, a batter is prepared and applied to the exterior of the patties. The batter also contained the stabilizer of the present invention. The batter formulation is:

| Component | Percent by Weight |
|---|---|
| Water | 68.1 |
| Flour, Gold Medal ® | 29.5 |
| Stabilizer of Example 1 | 2.4 |

In order to make the batter, the stabilizer is mixed into water and heated to above 30° C. to dissolve the stabilizer. Then the flour is mixed in. After the batter is applied to the exterior of the patties, the battered patties are breaded with the following mix:

| Component | Percent by Weight |
|---|---|
| Flour, Gold Medal ® | 71.22 |
| Pregelatinized Starch, Fridex W | 1.78 |

Once breaded, the patties are deep fat fried in oil at 175° C. to obtain an internal temperature of 75° C.

EXAMPLE 5

This example teaches making a cholesterol free egg which is stabilized in accordance with the present invention. Eggs are made with the following formulation:

| Formula | Percent by Weight |
|---|---|
| Egg whites | 62.18 |
| Water | 20.98 |
| Vegetable oil | 10.18 |
| Starch, Purity CSC ® | 4.66 |
| Stabilizer of Example 1 | 0.78 |
| Salt | 0.39 |
| Food coloring, Yellow | 0.85 |

The eggs are formulated and cooked.

EXAMPLE 6

This example illustrates making the stabilizer of the present invention with pregelatinized starch. In one illustration all components are combined in a slurry and heated together. In another illustration the stabilizer of Example 1 is used.

In the first illustration, acid, gelatin and water at 10° C. are mixed and soaked for 20 minutes. Then the slurry is heated to 45° C. and held at that temperature for 10 to 20 minutes under agitation. Next, pregelatinized starch is mixed into the slurry and the slurry heated to 60° C. and held there until smooth. The resulting slurry is then dried to form the stabilizer.

In a second illustration, water and pregelatinized starch are mixed at a temperature above 35° C. and then the dried stabilizer of Example 1 is added to the slurry. After the slurry has been agitated and has obtained a smooth consistency, the slurry is dried to form the stabilizer of the present invention.

EXAMPLE 7

This example illustrates stabilizing a brown gravy using a stabilizer made in accordance with Example 6, first illustration, where the stabilizer is dried before heating to 80° C. The gravy had the following formulation:

| Formula | Percent |
| --- | --- |
| Distilled water | 9.85 |
| Beef stock | 0.065 |
| Caramel color | 10 drops |
| Burgundy wine | 0.05 |
| Stabilizer | 0.66 |

To make the stabilized gravy, all ingredients are mixed at ambient temperature and then heated to 80° C. and cooled.

EXAMPLE 8

This example illustrates stabilizing eggs using a stabilizer made in accordance with Example 6, first illustration, where the stabilizer is dried before heating to 80° C. The following formulation was used:

| Formula | Percent |
| --- | --- |
| Eggs, whole | 61.98 |
| Distilled water | 30.72 |
| Vegetable oil | 2.13 |
| Stabilizer | 0.69 |
| Salt | 0.35 |

All ingredients are combined and brought to 62° C. The liquid egg mix is then fried at 80° C. to cook the eggs.

The stabilizer only hydrates and does not increase viscosity or pull moisture away from the egg, causing a texture problem. Then, when the egg is cooked, the stabilizer thickens as the egg coagulates, giving correct texture, stability, freeze-thaw, and microwavability.

EXAMPLE 9

This example illustrates stabilizing a sausage in accordance with the present invention using the stabilizer of Example 6, first illustration. The following sausage formulation was used:

| Formula | Amount (Percent) |
| --- | --- |
| Sausage | 98.20 |
| Modified Waxy Maize Starch[1] | 1.00 |
| Stabilizer | 0.80 |

[1]Fridex W from National Starch and Chemical Co.

The modified waxy starch is first heated in water to 60° C. and then dried.

All the materials are mixed together, allowed to stand at ambient temperature for 10 minutes and then fried.

EXAMPLE 10

This example illustrates stabilizing a farinaceous product, namely a tortilla shell.

First, a dough stabilizer in accordance with the present invention was formed:

| Formula | Parts by Weight |
| --- | --- |
| Water | 8 |
| Gelatin | 1 |
| Acid | ¼ |

This stabilizer is made following the procedure in Example 1 above.

Next, the dried stabilizer is incorporated in a dough for a tortilla to stabilize the tortilla. The formula for the tortilla is as follows:

| Formula | Percent by Weight |
| --- | --- |
| Flour | 57.46 |
| Water | 24.99 |
| Lard | 11.10 |
| Modified waxy maize[1] | 2.89 |
| Baking powder | 2.22 |
| Salt | 1.02 |
| Stabilizer | 0.32 |

[1]Frigex W from National Starch and Chemical Co.

The ingredients except water and stabilizer are mixed together until all lumps are gone. Then the water with stabilizer therein are mixed in.

EXAMPLE 11

This example illustrates using the dough stabilizer of Example 10 above to stabilize a pancake mix. Pancakes were formulated as follows:

| Formula | Percent |
| --- | --- |
| Commercial mix | 48.206 |
| Modified waxy maize[1] | 1.339 |
| Water | 49.761 |
| Dough stabilizer | 0.694 |

[1]Frigex W from National Starch and Chemical Co.

First, the dough stabilizer is added to 20% of the water and heated to 45° C. and held there for 10 minutes. Next, the remaining water is added to the warm water and the stabilizer and water is added to the dry ingredients.

EXAMPLE 12

This example illustrates stabilizing a meat and bean burrito filling and then using that filling in conjunction with the tortilla shell of Example 10 to make a frozen burrito. The burrito filling is as follows:

| Formula | Percent |
|---|---|
| Water | 27.98 |
| Drained pinto beans | 9.57 |
| Beef (50% lean, 50% fat) | 8.9 |
| Tomato paste | 1.18 |
| Burrito seasoning | 1.66 |
| Starch[1] | 2.75 |
| Stabilizer of Example 1 | 0.41 |

[1]Purity W from National Starch and Chemical Co.

All ingredients except seasoning, meat and stabilizer are mixed and heated to 85° C. Then the meat and stabilizer are added, the ingredients are continued to be mixed, and then the seasoning is added in. The seasoning, if it contains salt, should be added at the end. If it contains no salt, then the seasoning is mixed in initially with the other ingredients.

The filling is then wrapped in the tortilla and frozen.

EXAMPLE 13

This example teaches stabilizing tomato sauce in accordance with the present invention. A tomato sauce of the following formulation is prepared:

| Formula | Percent |
|---|---|
| Commercial tomato sauce | 14.20 |
| Pregelatinized starch[1] | 0.71 |
| Gelatin (300 Bloom) | 0.16 |

[1]Instant Pure Flo from National Starch and Chemical Co.

The sauces and gelatin are mixed at 10° C. and held for 20 minutes. Then the mix is heated to 45° C. and the starch is added. This mix is then held at 45° C. for 10 to 20 minutes and then the temperature raised to 60° C.

Most sauces have a pH within the range of 1.0 to 4.5. Good results are obtained by lowering the pH to below about 4.0 prior to adding the gelatin. Vinegar has been found to be good for adjusting the pH in tomato sauce.

It is noted that all salt additions should be done at the end of the cooking process since the ions in salt, namely sodium, tend to interfere with the acting of the gelatin in the food system.

From a manufacture of gelatin, the finished slurry before drying, has a solids content of about 30% by weight. To this slurry, the temperature is raised to about 45° C., enough acid is added to adjust the pH to about 1.0 to 4.5, and the slurry is agitated for 10 minutes. Then the slurry is dried as previously disclosed. This produces the dried gelatin component for use in stabilizing food in accordance with the present invention.

EXAMPLE 14

This example illustrates the importance of phosphoric acid compared to other acids.

Using tap water, six solutions were made using a conventional 300 Bloom gelatin. Each solution contained the same amount of tap water and gelatin. In order to prepare each solution, the pH of the tap water was adjusted to about 2 with the acid. Then the gelatin was added to the water and allowed to hydrate at room temperature for 20 minutes. Next, the solution was heated to 70° C. and the pH adjusted to about 4 with the acid again. These samples were then frozen overnight and the loss of water was measured. The results from these tests and the acids used are listed below:

| Acid | Water Loss (% by wt.) |
|---|---|
| Sulfuric | 6.8 |
| Hydrochloric | 4.2 |
| Glacial acetic | 3.6 |
| Citric | 4.8 |
| Lactic | 2.8 |
| Phosphoric | 2.2 |

As can be seen, phosphoric gave superior results but all the acids gave acceptable results.

EXAMPLE 15

This example illustrates making a canned meat with the stabilizer of the present invention. The meat formulation is as follows:

| Ingredient | Amount (% by wt.) |
|---|---|
| Fine ground meat | 85 |
| Salt | 2 |
| STP | .25 |
| Starch | 2.5 |
| Water | 10 |
| Gelatin (275 Bloom) | .25 |

In order to make the canned meat, the gelatin is added to tap water which had its pH adjusted to about 2 with phosphoric acid. The gelatin is allowed to hydrate for 20 minutes and then the sodium tripoly-phosphate (STP) is added to the water. Then the meat, starch, salt and hydrated gelatin slurry are mixed together.

Suitable meats include chicken, pork, beef, turkey, horse, lamb and fish.

It has been found that the canned meat has improved texture compared to conventional canned meats and is able to be fried in a pan without losing its texture.

EXAMPLE 16

This example illustrates the use of the stabilizer to improve the texture of a cheese analogue and to reduce the amount of casein used to make the cheese analogue. The following formulation was used:

| Ingredient | Amount (% by wt.) |
|---|---|
| Water | 30.00 |
| Oil | 20.00 |
| Casein | 25.00 |
| Real cheese | 10.00 |
| Spices and Preservatives | 4.50 |
| Stabilizer: | |
| Starch | 0.50 |
| Dried gelatin component | 0.75 |

The water, oil, and casein are mixed and then the starch is added. The mixture is heated to 90° C. and the dried gelatin added once the starch has gelatinized. Next, the seasonings and preservatives are added along with the real cheese component (mozzarella).

This cheese has been used on pizza and it was found that the cheese retained its form and did not absorb sauces the way other conventional cheeses did.

EXAMPLE 17

This example illustrates the improved texture of real cheese using the stabilizer of the present invention. The following formulation was used:

| Ingredients | Amount (% by wt.) |
|---|---|
| Cheddar cheese | 94.50 |
| Stabilizer: | |
| Starch slurry | 5.00 |
| Gelatin component | .50 |

The cheese and stabilizer were mixed at 82° C. and the mixture formed into a block and frozen. After a week in the freezer, it was thawed and found to have excellent texture.

It will be understood that the claims are intended to cover all changes and modifications of the preferred embodiments of the invention herein chosen for the purpose of illustration which do not constitute a departure from the spirit and scope of the invention.

What is claimed is:

1. A process for making a canned ground meat with improved texture such that said canned ground meat is able to be pan-fried, said process comprising the steps of:
    a) dissolving gelatin in water by first hydrating gelatin in water with a sufficient amount of acid to adjust the pH of the water to about 1 to about 4, and then heating the hydrated gelatin to about 140° F. (60° C.) to fully dissolve the gelatin in the water;
    b) hydrating starch in water in the presence of sodium tripoly phosphate;
    c) combining a ground meat with a sodium salt to form a mixture;
    d) mixing the dissolved gelatin, the hydrated starch and the salt and meat mixture to form a meat formulation, and
    e) canning said meat formulation to produce a canned ground meat having improved texture such that said canned ground meat is able to be pan-fried.

2. The process of claim 1 wherein said ground meat is chicken and said acid is phosphoric.

3. The process of claim 1 wherein the total amount of salt in said meat formulation is about 0.25% to about 5.0% by weight.

4. The process of claim 1 wherein said ground meat is selected from the group consisting of chicken, pork, beef, turkey, horse, lamb and fish.

5. The process of claim 1 wherein said canned ground meat comprises:
    about 85% by weight ground meat;
    about 0.5% by weight gelatin;
    about 2.5% by weight starch;
    about 2.0% by weight sodium salt; and
    about 10.0% by weight water.

6. The process of claim 1 wherein said canned ground meat comprises:
    about 85% by weight ground meat;
    about 0.25% by weight gelatin;
    about 2.0% by weight sodium salt;
    about 0.25% by weight sodium tripoly-phosphate;
    about 2.5% by weight starch; and
    about 10.0% by weight water.

7. A process for stabilizing water in a canned ground meat comprising the steps of:
    (a) agitating a slurry of gelatin, acid and water, at a temperature of about 10° C. to about 100° C., for a period of time of at least about 10 minutes, to fully hydrate said gelatin, said gelatin being present in said slurry in an amount of about 0.5% to about 15% by weight of said slurry, said acid being present in an amount to cause said slurry to have a pH of about 1 to about 4, wherein said acid is selected from the group consisting of glacial acetic acid, citric acid, lactic acid, hydrochloric acid, sulfuric acid, phosphoric acid and aqueous solutions thereof;
    (b) maintaining said slurry at a pH of about 1 to about 4;
    (c) recovering a gelatin component having a pH of about 1 to about 4, said gelatin component comprising gelatin and said acid;
    (d) forming a meat formulation comprising a ground meat, water starch, sodium salt and said gelatin component;
    (e) canning said meat formulation to produce a canned ground meat having improved texture such that said canned ground meat is able to be pan-fried.

8. The process of claim 7 wherein said starch is selected from the group consisting of flour, starch granules, pregelatinized starch, modified starch and starch derivatives.

9. The process of claim 7 wherein said ground meat is selected from the group consisting of chicken, pork, beef, turkey, horse, lamb and fish.

10. The process of claim 7 wherein said canned ground meat comprises:
    about 85% by weight ground meat;
    about 0.5% by weight gelatin;
    about 2.5% by weight starch;
    about 2.0% by weight sodium salt; and
    about 10.0% by weight water.

* * * * *